US005489457A

United States Patent [19]

Vent

[11] Patent Number: 5,489,457

[45] Date of Patent: Feb. 6, 1996

[54] REFLECTIVE TAPE

[75] Inventor: Debra S. Vent, Webster, N.Y.

[73] Assignee: Xerox Corporation, Stamford, Conn.

[21] Appl. No.: 350,288

[22] Filed: Dec. 6, 1994

[51] Int. Cl.[6] .............................. B60R 13/00; G09F 13/16

[52] U.S. Cl. .............................. 428/40; 359/515; 428/204; 428/209; 428/192; 428/914

[58] Field of Search .............................. 428/40, 204, 209, 428/192, 344, 354, 914, 31; 156/230; 359/515

[56] References Cited

U.S. PATENT DOCUMENTS 4,101,698 7/1978 Dunning .................................... 428/40

4,801,514 1/1989 Will ........................................... 428/354

*Primary Examiner*—Nasser Ahmad

*Attorney, Agent, or Firm*—Michael J. Nickerson

[57] ABSTRACT

A reflector tape assembly includes a reflective tape, a release liner, and a protective liner. The protective liner is attached to the reflective surface of the reflective tape. The protective liner protects the reflective surface of the reflective tape from scratches and other damage or contamination occurring during shipping, handling, and assembly. The protective liner is removed after the illuminator system is installed in the machine. The release liner protects the adhesive surface of the reflective tape during handling. The release liner ensures that the adhesive surface does not lose any tackiness or otherwise become damaged so as to have adhesion failure due to contamination during shipping and handling.

6 Claims, 2 Drawing Sheets

REFLECTIVE TAPE

FIELD OF THE PRESENT INVENTION

The present invention is directed to a reflective tape to be utilized as a surface of a reflector. More specifically, the present invention is directed to a reflective tape which includes protective linings and handles to facilitate easier assembling of an opposing reflector illumination system.

BACKGROUND OF THE PRESENT INVENTION

Conventionally, illumination systems or devices which are used to scan documents typically include an illumination source such as a tungsten lamp or fluorescent lamp and an opposing reflector. More specifically, in conventional systems, the illumination source would be located on one side of an optical center line of the scanner under a platen or constant velocity transport (CVT) system while the reflector would be positioned on the opposite side of the optical center line of the scanner under the platen or CVT system. Thus, the illumination source, in conjunction with the opposing reflector, would provide proper illumination of the document or object being scanned by the scanner. It is noted that document and object, in the present specification, are interchangeable and refer to the physical object that is being scanned.

The opposing reflector serves two distinct purposes in an illumination system as described above. The first purpose is to redirect light which would have normally missed the document back to the illuminated region of the document, thereby significantly increasing the total irradiance impinging upon the document without additional input power being applied to the lamp or light source. Moreover, the opposing reflector suppresses shadowing due to paste-ups or other surface irregularities on the document by supplying light from an angle opposite the angle corresponding to the light being directly contributed by the lamp. An example of such a conventional system is illustrated in FIG. 1.

FIG. 1 illustrates the document illumination components in a conventional scanner which can be utilized as a stand alone scanner or in a copier. Moreover, the illumination system illustrated in FIG. 1 may be utilized in either a light lens scanning system or a digital (image input terminal) scanning system (platen or CVT) so as to properly illuminate the document for reproduction, display, and/or storage in an electronic memory, magnetic medium, or optical disk. The illumination system of FIG. 1 includes a platen 3 upon which a document 1 rests. The document 1 is illuminated by a light source 7 which provides an active source of light to irradiate the illuminated region of the document. Typically, this source of light is provided by a linear fluorescent lamp (with or without apertured reflecting coatings on the interior lamp surface, or by linear tungsten lamps. As noted above, the light source 7 is situated on one side of an optical center line 6. An imaging system (not shown) causes an image of the portion of the document immediately surrounding this optical centerline 6 to be projected onto a linear array of photosensors (not shown). On the opposite side of the optical center line, an opposing reflector 5 is situated. The opposing reflector 5 provides indirect illumination to the document being scanned by redirecting light which would normally not illuminate the document (light leaving the light source in a parallel or substantially parallel path with respect to the platen 3) back to the illuminated region of the document. Moreover, the opposing reflector 5 reflects light back to the document at an angle opposite from the angle of light being directly contributed by the light source 7. This reflection suppresses shadowing on documents with paste-up or other non-planar surface features.

Conventionally, the opposing reflector 5 is formed from extruded aluminum or a formed piece of aluminum sheet stock. A highly reflected finish is then applied, by polishing and optionally the application of special coatings, to the aluminum to provide the reflective surface of the opposing reflector 5. It is further noted that the opposing reflector 5 may have a thin flat glass mirror attached to its surface to improve reflectivity. However, such a thin flat glass mirror limits the surface to having an essentially flat profile.

Although the conventional illumination systems provide adequate illumination for a scanner, various problems are associated with conventional illumination systems. One such problem is the mechanical tolerances required for obtaining proper reflector to lamp alignment in the scanner. More specifically, the alignment between the opposing reflector and light source must be precisely set and maintained to provide the desired illumination efficiency and profile on the document for proper scanning.

One problem with conventional illumination systems is their reflective efficiency and left to right illumination balance. More specifically, the reflectors in conventional illumination systems utilizing polished aluminum with special coatings typically have a reflectance value of less than 70%. Thus, the opposing reflector in the conventional illumination system has a reflective efficiency of less than 70%. This efficiency has a direct effect upon the left to right illumination balance of the illumination system.

For example, it is desirable to maximize the irradiance at the document at the optical center line, and simultaneously receive nearly equal irradiance contributions from the lamp and reflector sides. If the reflectance value of the opposing reflector is reduced, the overall irradiance as well as the reflector side irradiance contribution are correspondingly reduced for a given illuminator design. This adversely impacts both the total illuminator efficiency as well as the side-to-side balance. Clearly, achieving a reflectance value of the opposing surface as close to 100% as possible not only improves the overall illuminator efficiency but also improves the ability to achieve equal irradiance contributions from each side of the optical center line.

Another problem with conventional illumination systems is the repair and maintenance of these illumination systems. More specifically, when an opposing reflector is damaged, the aluminum reflector must be either replaced or removed, repolished, and placed back into the illumination system so as to restore the illumination system to its original performance. Thus, the repair of the conventional illumination system can be complicated and costly.

Lastly, the conventional devices encounter problems from scratches on the reflector's surface. The scratches and/or contaminations occur most commonly during the shipment of parts and/or assembly of an illuminator system. The reflectors must be free from scratches and/or contaminations to ensure efficient reflectance.

Therefore, it is desirable to provide a reflector for an illumination system for a scanner which has high reflective efficiency so as to realize optimial left to right illumination balance, a simplified design to reduce the complexity and cost of repairing such an illumination system, and that avoids scratches and/or contaminations during shipment or assembly.

SUMMARY OF THE PRESENT INVENTION

One aspect of the present invention is a reflective tape assembly. The reflective tape assembly includes a reflective tape portion and a release liner positioned on one side of the reflective tape portion. The reflective tape assembly also includes a protective liner positioned on an opposite side of the reflective tape portion.

Another aspect of the present invention is a reflective tape assembly. The reflective tape assembly includes a reflector having a reflective surface and an adhesive surface. The reflective tape assembly also includes first liner means for preventing the adhesive surface from losing tackiness and second liner means for protecting the reflective surface from damage.

Further objects and advantages of the present invention will become apparent from the following descriptions of the various embodiments and characteristic features of the present invention.

BRIEF DESCRIPTION OF THE DRAWINGS

The following is a brief description of each drawing used to describe the present invention, thus, are being presented for illustrative purposes only and should not be limitative of the scope of the present invention, wherein.

DETAILED DESCRIPTION OF THE PRESENT INVENTION

Figure 1:
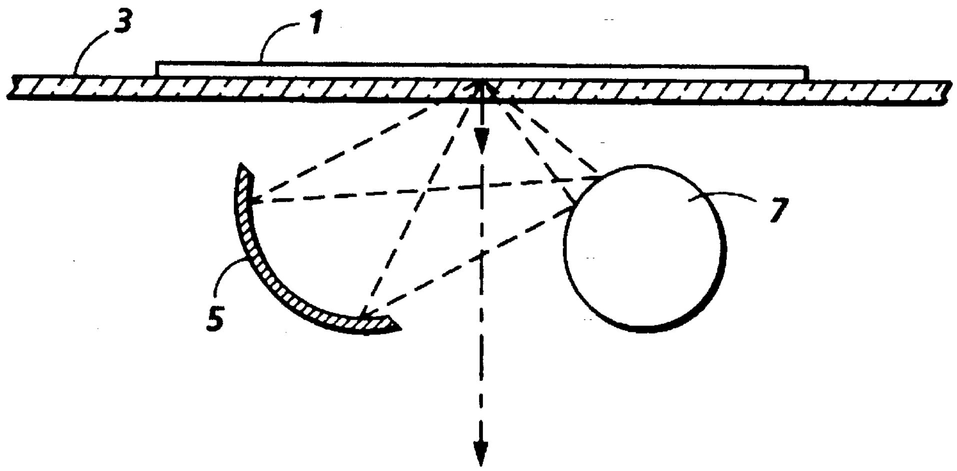
FIG. 1 PRIOR ART
FIG. 1 illustrates a conventional illumination system for an image scanner.

The following will be a detailed description of the drawings illustrated in the present invention. In this description, as well as in the drawings, like references represent like devices performing equivalent functions.

Figure 2:
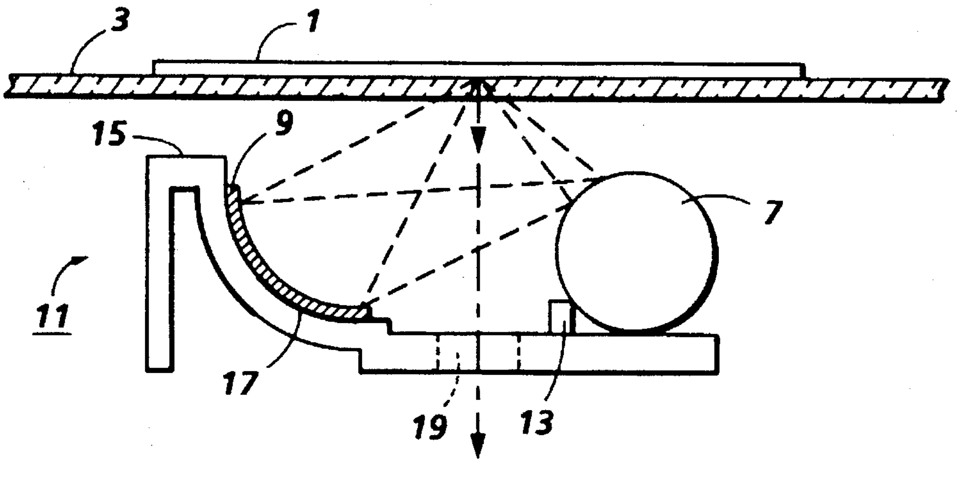
FIG. 2 illustrates an illumination system for an image scanner according to the present invention.

FIG. 2 illustrates an illumination system for a scanner according to the concepts of the present invention. In FIG. 2, an illumination system includes a platen 3 upon which a document 1 rests. The document 1 is irradiated directly by light from light source 7 and indirectly by light reflected from an opposing reflector 9. The opposing reflector 9 and light source 7 are attached to an illumination system registration device 11.

The light reflected from the document 1 passes through an opening or slit 19 in the illumination registration device 11. Upon passing through the opening 19, the reflective light impinges upon either CCD sensors, a full-width array, a photoreceptor, or any other photosensitive material which can be utilized in recording the image being scanned on the document 1.

The illumination system registration device 11 includes an opposing reflector locating surface 17 and a lamp locating surface 13 for providing proper registration and alignment between the light source 7 and the reflector 9. The opposing reflector locating surface 17 is shaped in the same shape as the opposing reflector 9. This shape, as long as it matches the desired shape of the opposing reflector, may be of any desired shape or curvature. The actual shape of the opposing reflector 9 and opposing reflector locating surface 17 is any conventional design which provides the proper reflectance profile for the illumination system.

The illumination registration device 11 may be constructed of a molded polymer or plastic or a precast metal part wherein the mechanical tolerances needed for proper alignment are built into the device so that when an opposing reflector is registered to and attached to the opposing reflector locating surface 17 and a light source is registered to and attached to the lamp locating surface 13, proper reflector to lamp alignment is realized without the need for any additional manual adjustments. More specifically, the opposing reflector surface 17 and the lamp locating surface 13 are preformed into the polymer, plastic, or metal so that the mechanical tolerances are already taken into account, thereby eliminating the need for additional manual adjustments to properly align light source 7 and the reflector 9. This registration method substantially eliminates variances in an illuminator's profile from one illumination system to another. The illuminator registration device 11 also includes a platen locating surface 15 so as to properly register the illumination system to the platen 3 or platen assembly.

The actual reflective tape used in opposing reflector 9 will be described in more detail below with respect to FIG. 3.

Figure 3:
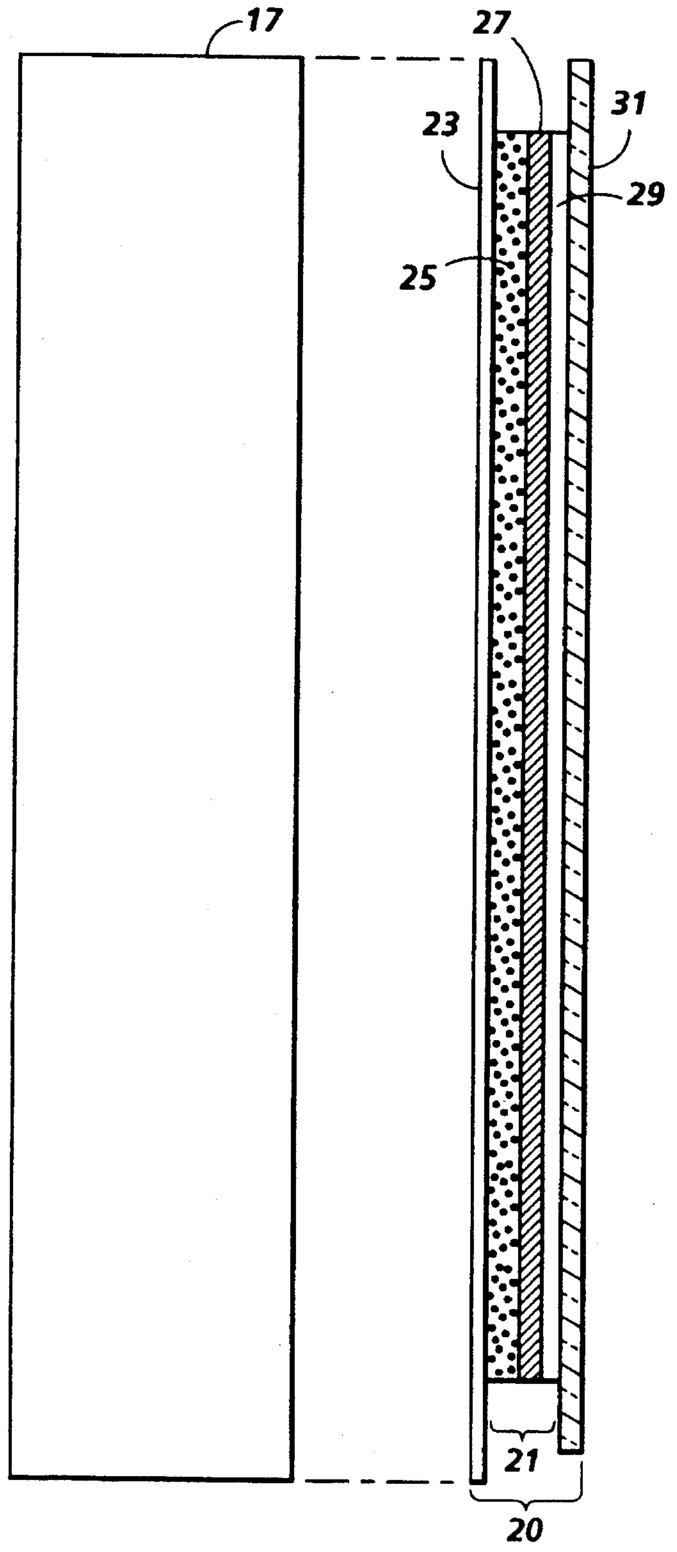
FIG. 3 illustrates a tape design according to the present invention.

FIG. 3 illustrates a reflective tape design according to the concepts of the present invention. A reflector tape assembly 20 includes a reflective tape 21. The reflective tape 21 is constructed of a chrome film 27 over which a clear substrate 29 is formed. On the other side of the chrome film 27, an adhesive layer 25 is applied so that the reflective tape 21 can be properly adhered to a surface. In the preferred embodiment of the present invention, the adhesive layer 25 is utilized to adhere the reflective tape to the opposing reflector surface 17 as illustrated in FIG. 3. It is noted that although FIG. 3 fails to illustrate any curvature for the opposing reflector surface 17, in the preferred embodiment of the present invention, the opposing reflector surface 17 has a specific curvature to optimize the illumination profile of the illumination system.

The reflective tape assembly 20 of the present invention further includes a protective liner 31 which is attached to the clear substrate 29 of the reflective tape 21. It is noted that the protective liner 31 can be adhered to the clear substrate 29 based on electrostatic forces or with an adhesive that will be completely removed upon removal of the protective liner. The protective liner 31 protects the clear substrate of the reflective tape 21 from scratches and other damage or contamination occurring during shipping, handling, and assembly. The protective liner 31 is removed after the illuminator system is installed in the machine. Thus, the protective liner 31 provides protection to the reflector during the whole assembly process. In addition, the protective liner 31 may be printed with instructional information to reinforce its intended time of removal.

The reflective tape assembly 20 of the present invention also includes a release liner 23 which protects the adhesive surface layer 25 of the reflective tape during handling. This release liner 23 ensures that the adhesive layer 25 does not lose any tackiness or otherwise become damaged so as to have adhesion failure due to contamination during shipping and handling.

The liners 23 and 31 of the reflective tape assembly 20 also perform functions in addition to protecting the outside layers of the reflective tape 20. For example, the release liner 23 extends beyond the protective liner 31 so that the release liner 23 can be easily removed before the protective liner 31 without removal of the protective liner 31. By extending beyond the protective liner 31, the release liner 23 provides a handle allowing the release liner 23 to be pulled away from the reflective tape 20. The extended portion should be such that the release liner 23 includes a tab to provide a substantial handle for an assembler's hand, thereby eliminating the need for tools when removing the release liner 23 from the reflective tape 20. This extended portion prevents contamination and damage to the adhesive by eliminating the need to hold onto the actual reflective tape 20 during handling and assembly. The extension of the release liner 23 can be made thicker than the portion coming in contact with the adhesive to provide a more robust handle. Moreover, the entire release liner 23 can be made thicker to provide a more robust handle. Lastly, the extension of the release liner 23 may be made wider to provide a more robust handle.

The release liner 23 is removed just before adhering the reflective tape 20 to the reflector locating surface 17. This allows maximum protection for the adhesive layer 25. The protective liner 31 remains after adhering the reflective tape 20 to the opposing reflector surface 17 to maximize protection for the clear substrate 29.

The protective liner 31 also extends on both ends beyond the actual length of the reflective tape 20 to provide tabs which enable easy removal of the protective liner 31 when assembly is completed; however, the protective liner 31 does not extend as far as the release liner 23 on one side of the reflective tape 20. In the preferred embodiment of the present invention, the liners 23 and 31 both extend 15 centimeters beyond the edge of the reflective tape 20; whereas the protective liner 31 extends 15 centimeters beyond the edge of the reflective tape 20 on the other side, and the release liner 23 extends approximately 32 centimeters beyond the edge of the reflective tape 20 on the other side.

The extension of the protective liner 31 provides the assembler with something to hold on to while the assembler is applying the reflective tape to the opposing reflector surface 17. The extended part of the protective liner 31 can be made thicker than the portion coming in contact with the clear substrate 29 to provide a more robust handle. Moreover, the protective liner 31 may be made wider at the extended part to provide a more robust handle. In addition, the protective liner 31 is clear so that the assembler can easily see through it to properly register the reflective tape onto the opposing reflector locate surface 17 of the illumination system.

In one embodiment of the present invention, the reflective tape 20 is a reflective tape made by 3M™ having a product name ECP-305 and a reflectance value of 96%.

In the actual assembling of an illumination system as illustrated in FIG. 2, the reflective tape 20, with protective liner 31 intact, is applied to the opposing reflector locate surface 17 such that the reflective tape 20 and protective liner 31 take on the actual shape of the surface 17. In other words, the shape of the opposing reflector locating surface 17, in conjunction with the reflective tape 20, provides the desired reflective properties and profile needed in the illumination system.

By utilizing a reflective tape having a reflectance of 96%, the illumination system realizes a higher reflective efficiency and improved left to right illumination balance. Furthermore, should the illumination system become damaged; i.e., the opposing reflector becomes damaged; the damaged reflector can be restored to its original performance by applying a new strip of reflective tape. It is noted that depending on the nature of the damage, removal of the old strip of reflective tape may not be necessary. Also, with the utilization of the protective liner and release liner, the reflective tape becomes more robust, thereby minimizing damage due to shipping, handling, and assembling.

It is noted that the present invention can be utilized in a digital scanner wherein the reflected light (light reflected from the image) passing through the slit or opening 19 impinges upon a CCD sensor or full width array sensor. The CCD sensor or full width array sensor converts the received light into electrical signals or image data which represent the scanned image. The image data can then be processed, reproduced on an image recording medium, such as a document, displayed, or stored in an electronic, magnetic, or optical medium.

Furthermore, the present invention can be utilized in a digital or light lens copier wherein the reflected light (light reflected from the image) passing through the slit or opening 19 impinges upon a CCD sensor or full width array sensor in a digital copier or other photosensitive material such as a photoreceptor in a light lens system.

In the digital copier situation, the CCD sensor or full width array sensor converts the received light into electrical signals or image data which represent the scanned image. The image data can then be processed and/or displayed before being reproduced on an image recording medium, such as a document.

In the light lens copier situation, the photosensitive material converts the received light into a latent image of electrical charges which represent the scanned image. The latent image data can then be developed with a marking material and transferred to a image recording medium, such as a document.

The present invention has been described in detail above; however, various modifications can be implemented without departing from the spirit of the present invention. For example, the preferred embodiment of the present invention has been described in detail with respect to a three-layered chrome base reflective tape; however, the present invention can be readily implemented with any pliable reflective material that has an adhesive layer and a reflective surface; i.e., the reflective tape does require a clear substrate, just a highly reflective surface opposite the adhesive surface.

In recapitulation, the present invention provides a reflective tape assembly which provides protection for the reflective tape from damage during shipping and handling as well as provides handles for easy removal of the liners.

While the present invention has been described with reference to various embodiments disclosed herein before, it is not to be confined to the detail set forth above, but is intended to cover such modifications or changes as made within the scope of the attached claims.

I claim:

1. A reflective tape assembly, comprising:

a reflective layer;

a clear protective substrate positioned on one surface of said reflective layer;

an adhesive layer positioned on a surface of said reflective layer opposed to said clear substrate;

a removable release liner positioned on said adhesive layer; and a removable protective liner positioned on said clear protective substrate;

said reflective layer, said clear protective substrate, and said adhesive layer forming a integral reflective tape portion;

said removable protective liner having first tabs, extending beyond said reflective tape portion, for enabling removal of said removable protective liner from said clear protective substrate;

said removable release liner having second tabs, extending beyond both said reflective tape portion and said first tabs of said removable protective liner, for enabling removal of said removable release liner from said adhesive layer prior to the removal of said removable protective liner.

2. The reflective tape assembly as claimed in claim 1, wherein said reflective layer is a chrome film.

3. The reflective tape assembly as claimed in claim wherein said removable protective liner is transparent.

4. The reflective tape assembly as claimed in claim 1, wherein said second tabs of said removable release liner enables handling of the reflective tape assembly.

5. The reflective tape assembly as claimed in claim 1, wherein said first tabs of said removable protective liner enables handling of the reflective tape assembly.

6. The reflective tape assembly as claimed in claim 1, wherein said second tabs of said removable release liner provide enables handling of the reflective tape assembly and said first tabs of said removable protective liner enables handling the reflective tape assembly.

* * * * *